United States Patent [19]
Kline

[11] Patent Number: 4,664,138
[45] Date of Patent: May 12, 1987

[54] STEAM TRAP

[75] Inventor: Kevin B. Kline, Indianapolis, Ind.

[73] Assignee: ITT Corporation, New York, N.Y.

[21] Appl. No.: 785,908

[22] Filed: Oct. 9, 1985

[51] Int. Cl.⁴ .................................................. F16T 1/16
[52] U.S. Cl. .................................................. 137/183
[58] Field of Search .................... 137/183; 251/44, 45, 251/46

[56] References Cited

U.S. PATENT DOCUMENTS

| | | | |
|---|---|---|---|
| 2,480,712 | 8/1949 | Carbon | 251/44 X |
| 3,083,941 | 4/1963 | Abos | 251/46 |
| 3,291,439 | 12/1966 | Goldstein | 251/46 |
| 3,556,464 | 1/1971 | Griswold | 251/46 |
| 3,732,889 | 5/1973 | Conery | 251/45 X |

Primary Examiner—Alan Cohan
Attorney, Agent, or Firm—Donald J. Lenkszus

[57] ABSTRACT

There are disclosed steam traps for use, for example, in a steam system for expelling large quantities of condensate fluid at low pressures and for self locking closed at pressures above a predetermined pressure. The traps include a chamber having an input port and an output port. A movable piston blocks fluid flow between the input port and output port at high pressures but moves to an unblocking position at low pressures to permit fluid flow through the traps.

17 Claims, 5 Drawing Figures

STEAM TRAP

BACKGROUND OF THE INVENTION

The present invention relates to steam traps and more particularly to steam traps for expelling large quantities of condensate fluid at low pressures and for self locking in a closed position at pressures above a predetermined pressure.

Steam traps find many applications in steam systems. Such traps are necessary because when a steam system is started up, large amounts of condensate fluid are formed within the system conduits. Once a system reaches an on-stream normal operating condition, however, only small amounts of condensate are formed because the system conduits are heated to operating temperature and are generally well insulated. As an example, the ratio of condensate flow between system start up and the on-stream condition can be ten to one.

Steam systems generally include return lines which vent condensate fluid from the system conduits. The return lines, however, can be long and require the condensate to be lifted, necessitating high conduit pressure, in order for the system to vent the condensate. Under on-stream conditions, there generally is no problem because on-stream system pressures are generally high enough to vent the system of condensate and because only small amounts of condensate are produced.

However, during start up, large amounts of condensate are formed and the system is at low pressure. It is not unusual, therefore, for the system to be unable to vent the condensate formed during start up. This can cause a number of problems including, for example, blockage of the system conduits and ultimate conduit rupture or condensate back-up within the conduits into heating coils which are expensive to replace. What is required in such applications therefore is a steam trap which can expel large quantities of condensate fluid at low pressures and which can self lock closed at pressures above a predetermined pressure, such as at or slightly below the on-stream pressure of the steam system.

SUMMARY OF THE INVENTION

The invention provides a steam trap for expelling large quantities of condensate fluid at low pressures and for self locking in a closed position at pressures above a predetermined pressure. The steam trap includes a body including an input port and an output port. A chamber within the body communicates with the output port and includes sidewalls. The input port includes an extension extending into the chamber and has an end surface forming a seating surface within the chamber. A closure means is disposed within the chamber in substantially sealing engagement with the chamber sidewalls and has an orifice aligned with the input port extension and a surface area greater than the transverse cross-sectional area of the input port extension. The closure means is also movable within the chamber between a position in sealing engagement with the extension seating surface and a position displaced from the extension seating surface. The steam trap further includes biasing means for resiliently urging the closure means away from engagement with the extension seating surface.

As a result, when the steam pressure at the input port is below the predetermined pressure, the biasing measn displaces the closure means away from the extension seating surface permitting condensate fluid to flow from the input port, through the extension into the chamber, and out the output port. When the steam pressure at the input port increases, the fluid flow velocity within the chamber causes a pressure differential across the closure means, urging the closure means toward the extension seating surface. When the predetermined pressure is reached, the closure means is locked against the extension seating surface by virtue of the difference between the surface area of the closure means and the transverse cross-sectional area of the input port extension, thereby preventing fluid flow from the input port to the output port.

DETAILED DESCRIPTION

Figure 1:
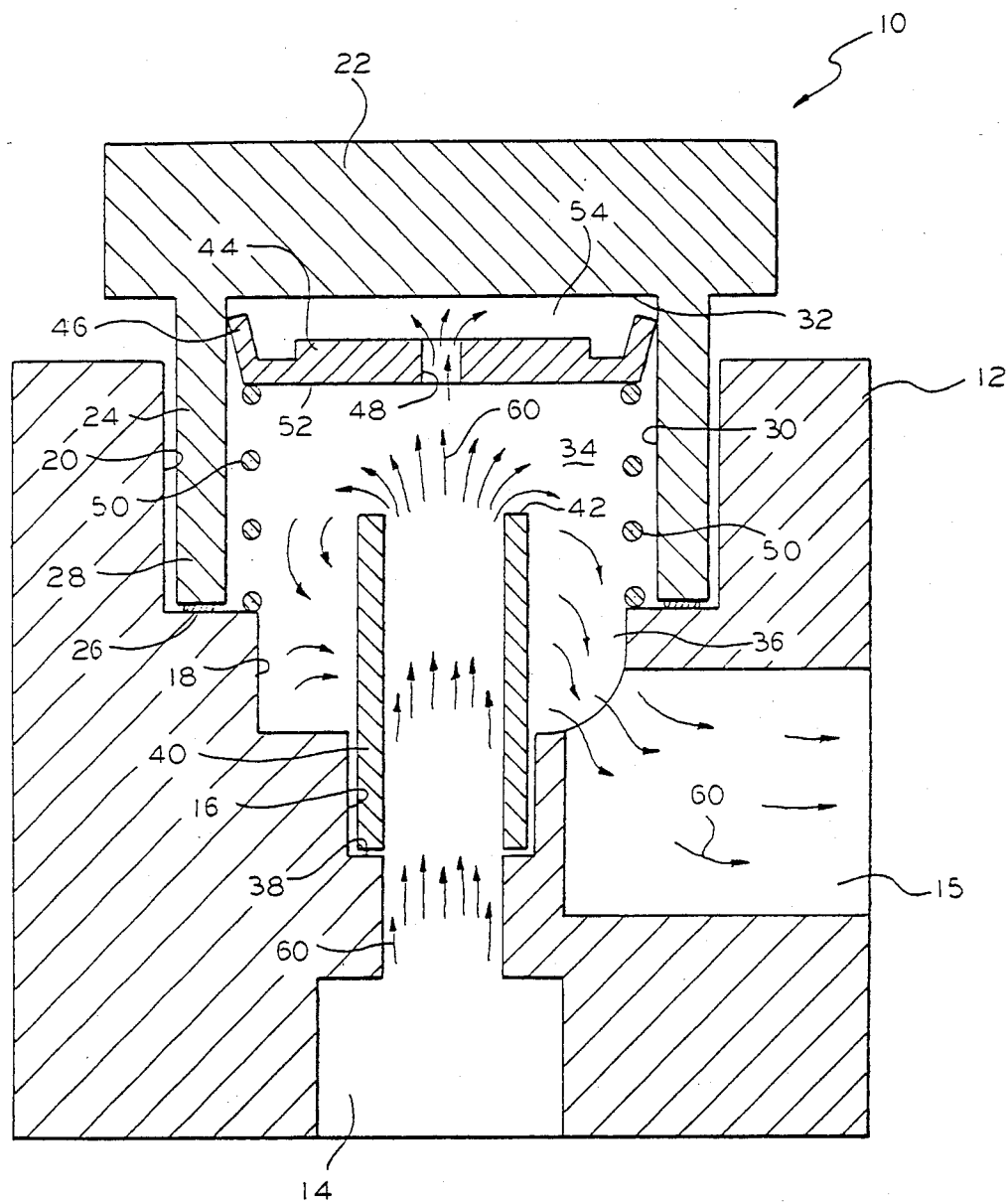
FIG. 1 is a cross-sectional side view of a steam trap embodying the present invention illustrating the steam trap in an open condition and expelling condensate fluid under low pressure.

Referring now to FIG. 1, it illustrates a steam trap 10 embodying the present invention. The steam trap 10 includes a body 12 which includes an input port 14 and an output port 15. The body 12 further includes a plurality of bores 16, 18, and 20 having incrementally increased diameters. The bore 20 is dimensioned for receiving an end cap 22 which has an elongated circumferential flange 24 which is received within the bore 20. The flange 24 and bore 20 can be threaded such that the cap is threadingly received within the bore 20. An annular seal 26 is disposed between the end of the flange 24 and a shoulder 28 to provide a fluid seal between the body 12 and the cap 22.

The inner wall 30 and top wall 32 of the cap 22 define with the body 12 a chamber 34. The chamber 34 is in direct fluid communication with the output port 15 by a lower annular chamber 36.

As can be seen in the figure, the bore 16 defines a shoulder 38. A cylindrical member 40 is received within the bore 16 and rests against the shoulder 38. The member 40 forms an input port extension which extends from the input port 14 into the chamber 34. The extension 40 includes a seating surface 42 at its end opposite the input port 14.

A closure means including a piston 44, is received within the chamber 34 and includes an integrally formed circumferential flange 46 which is in sealing engagement with the sidewalls 30 of the chamber 34. The piston 44 also includes an orifice 48 which is aligned with the input port extension 40.

As will be described subsequently, the piston 44 is movable between a position displaced from the extension seating surface 42 as illustrated in FIG. 1 when the steam trap is opened under low pressure, and a position in sealing engagement with the extension seating surface 42 when the predetermined pressure is reached. A biasing means in the form of a coiled spring is disposed between the shoulder 28 of the bore 20 and the inner surface 52 of the piston 44. The coil spring 50 urges the piston away from the extension seating surface 42.

As can be noted from FIG. 1, the cross-sectional area of the piston 44 is greater than the transverse cross-sectional area of the input port extension 40. Also, the flanges 46 form spacers for spacing the piston 44 away from the wall 32 of the chamber to form an upper cavity or chamber 54 when the steam trap is in an opened position.

In operation, when there is no condensate fluid flow through the steam trap 10, the fluid pressure on both sides of the piston 44 is equal and the spring force of the coil spring 50 holds the piston away from the extension seating surface 42 in an opened position. When condensate begins to flow as indicated by the arrows 60, the condensate impacts the surface 52 of the piston 44. The upward forces including the condensate impact force against the piston 44 and the pressure of the coil spring 50 are greater than the downward forces of pressure against the piston 44. As a result, at the lower pressures, the condensate fluid flows from the input port 14, through the input port extension 40, into the chamber 34, and out the output port 15. In this condition, the steam trap can expel large quantities of condensate fluid at low pressures.

As the pressure increases at the input port 14, the velocity of the fluid increases. This raises the fluid impact force but also increases the pressure component above the piston within the upper chamber 54 to a value higher than the pressure below the piston. The reason for this is that the energy of the fluid above the piston 44 is equal to that below the piston, but does not have any velocity component. Therefore, there is a higher static pressure within the upper chamber 54. When the fluid velocity is high enough, the pressure force down against the piston is greater than the sum of all of the upward forces. When the predetermined pressure is reached, the piston snaps closed against the extension seating surface 42 as illustrated in FIG. 2.

Figure 2:
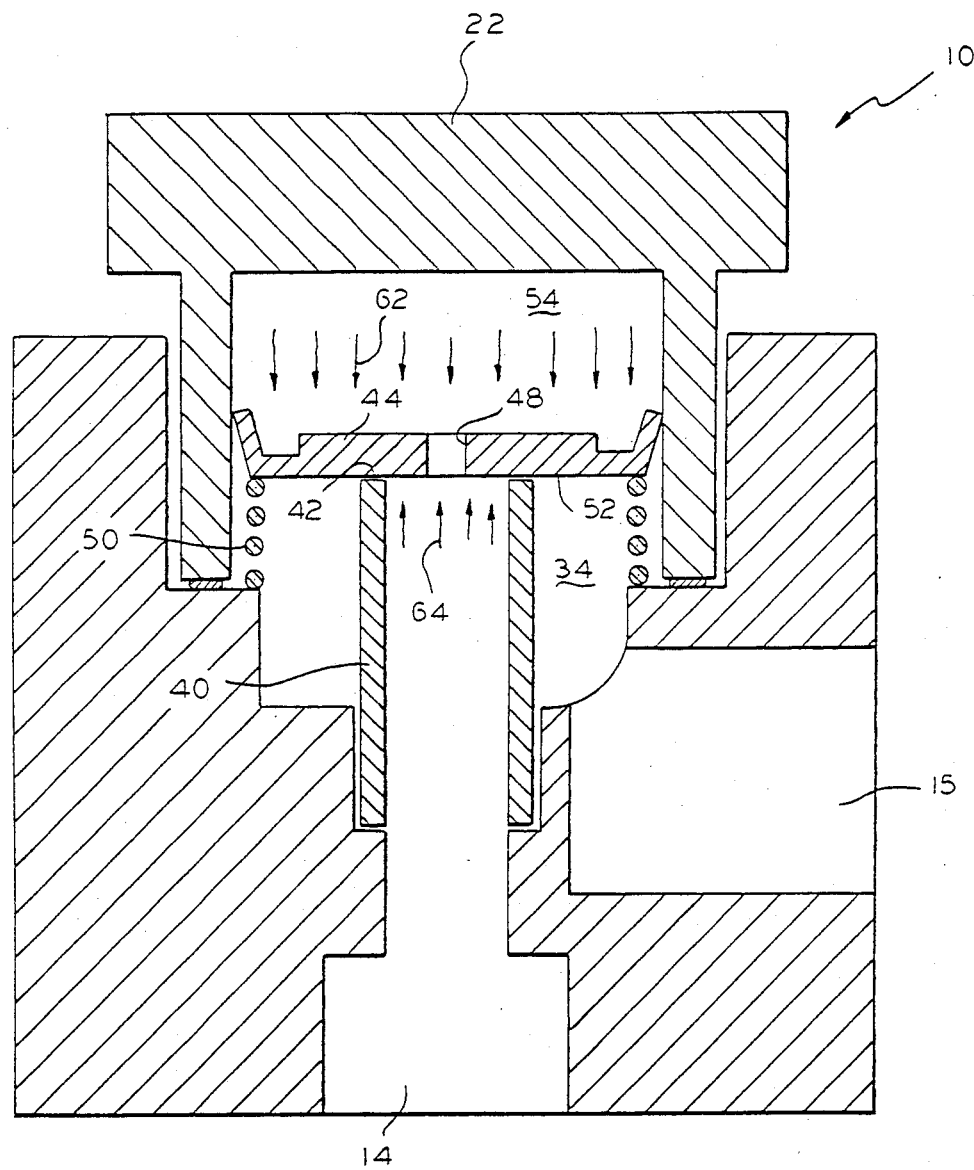
FIG. 2 is another cross-sectional side view of the steam trap of FIG. 1 but illustrating the steam trap in its self locked, closed position.

Referring now to FIG. 2 it can be seen that the piston 44 has moved to its closed position whereby the surface 52 of the piston is in sealing engagement with the seating surface 42 of the input port extension 40. Once the steam tap is closed in this condition, the top portion of the piston 44 is exposed to the same pressure as the seat portion of the piston by virtue of the fluid flow through the orifice 48. Because the piston 44 has a greater area than the transverse cross-sectional area of the input port extension 40, the force downward on the piston 44 as indicated by the arrows 62 is greater than the upward force against the piston as indicated by the arrows 64. Hence, the piston 44 is thereby held in the position against the seating surface 42 as illustrated. Also therefore, the steam trap 10 is held in its self locked, closed position when the fluid pressure reaches a predetermined pressure, such as, at or below the onstream pressure.

When the pressure drops below the closing pressure, the spring force of the spring 50 will force the piston away from the input port extension seating surface 42. Thereafter, the process just described is repeated.

Figure 3:
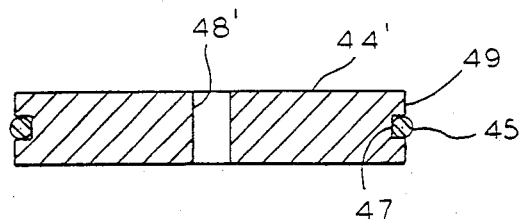
FIG. 3 is a cross-sectional side view of an alternative piston configuration which can be employed in the steam trap of FIGS. 1 and 2.

Referring now to FIG. 3, it illustrates another piston 44' which can be employed in the steam trap of FIGS. 1 and 2. Like the piston 44 of FIGS. 1 and 2, the piston 44' includes a central orifice 48'. However, unlike the piston 44, the piston 44' includes an annular sealing member 45 for making sealing engagement with the chamber sidewalls. The sealing member 45, which is preferably an o-ring, is disposed within an annular groove 47 within the piston sidewall 49.

Figure 4:
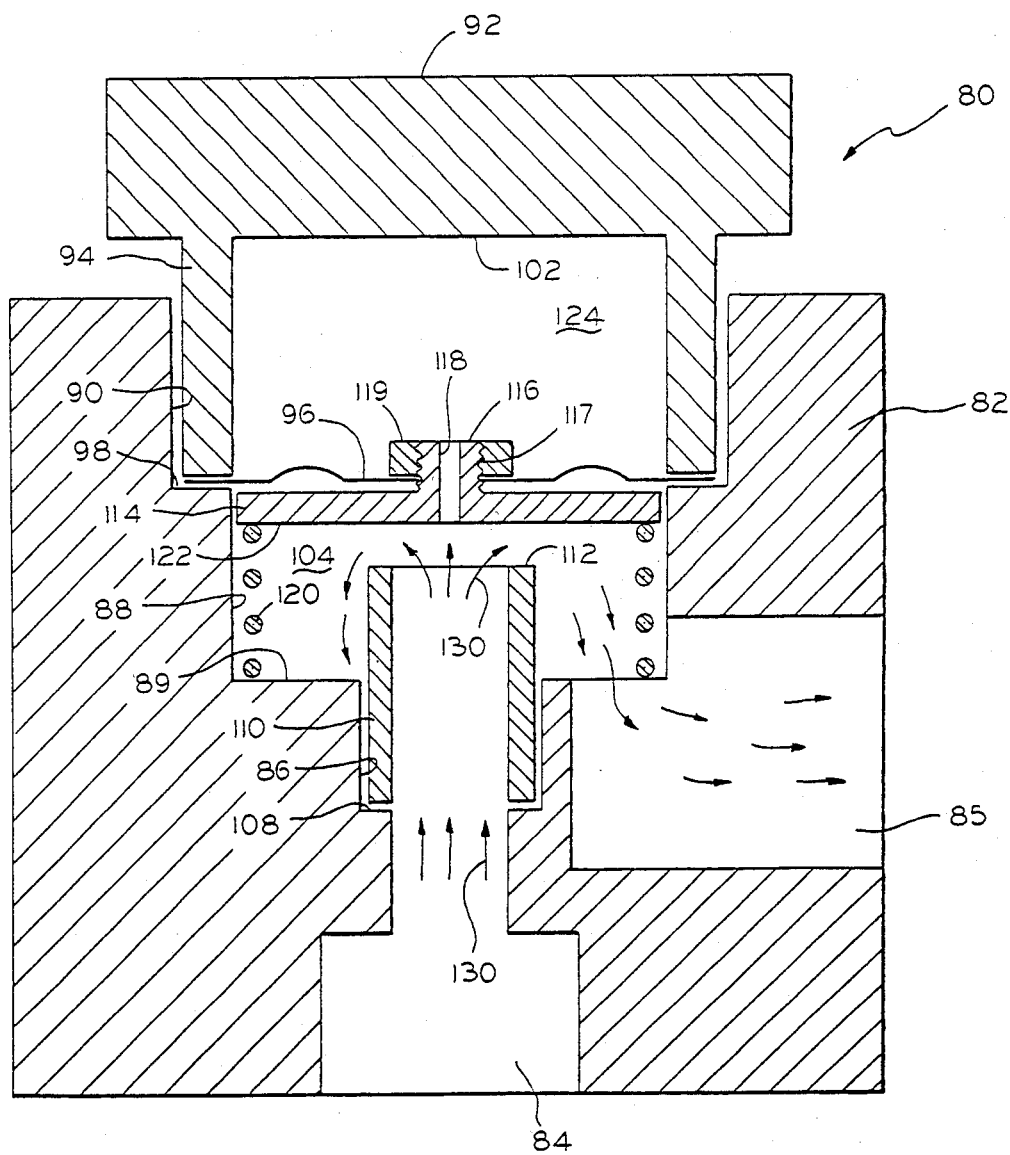
FIG. 4 is a cross-sectional side view of another steam trap embodying the present invention illustrating the steam trap in an open condition and expelling condensate fluid under low pressure.

Referring now to FIG. 4, it illustrates another steam trap 80 embodying the present invention. The steam trap 80 includes a body 82 which includes an input port 84 and an output port 85. The body 82 further includes a plurality of bores 86, 88, and 90 having incrementally increased diameters. The bore 90 is dimensioned for receiving an end cap 92 which has an elongated circumferential flange 94 which is received within the bore 90. The flange 94 and bore 90 can be threaded such that the cap is threadingly received within the bore 90. As will be described subsequently, a diaphragm 96 is disposed between the end of the flange 94 and a shoulder 98 to provide a fluid seal between the body 82 and the cap 92.

The bore 88, the diaphragm 96, and a shoulder 89 define a chamber 104. The chamber 104 is in direct fluid communication with the output port 85.

As can be seen in the figure, the bore 86 defines a shoulder 108. A cylindrical member 110 is received within the bore 86 and rests against the shoulder 108. The member 110 forms an input port extension which extends from the input port 84 into the chamber 104. The extension 110 includes a seating surface 112 at its end opposite the input port 84.

A piston 114 is received within the chamber 104 and is supported therein by the diaphragm 96 which is formed from a resilient material. The piston includes a central extension 116 having an outer thread 117. The extension is received through an aperture within the diaphragm 96 and is secured thereto by a nut member 119. The piston 114 also includes an orifice 118 which extends through the extension 116 and is aligned with the input port extension 110.

As will be described subsequently, and like the piston 44 of FIGS. 1 and 3, the piston 114 is movable between a position displaced from the extension seating surface 112 as illustrated in FIG. 4 when the steam trap is opened under low pressure, and a position in sealing engagement with the extension seating surface 112 when the predetermined pressure is reached. A biasing means in the form of a coiled spring is disposed between the shoulder 89 of the bore 88 and the inner surface 122 of the piston 114. The coil spring 120 urges the piston away from the extension seating surface 112.

As can be noted from FIG. 4, the cross-sectional area of the diaphragm 96 is greater than the transverse cross-sectional area of the input port extension 110. Also, the diaphragm 96 is spaced away from the wall 102 of the chamber to form an upper cavity or chamber 124.

In operation, when there is no condensate fluid flow through the steam trap 80, the fluid pressure on both sides of the diaphragm 96 is equal and the spring force of the coil spring 120 holds the piston 114 away from the extension seating surface 112 in an opened position. When condensate begins to flow as indicated by the arrows 130, the condensate impacts the surface 122 of the piston 44 and the diaphragm 96. The upward forces including the condensate impact force against the piston 44 and diaphragm 96 and the pressure of the coil spring 120 are greater than the downward forces of pressure against the diaphragm 96. As a result, at the lower pressures, the condensate fluid flows from the input port 84, through the input port extension 110, into the chamber 104, and out the output port 85. In this condition, the steam trap can expel large quantities of condensate fluid at low pressures.

As the pressure increases at the input port 84, the velocity of the fluid increases. This raises the fluid impact force but also increases the pressure component above the piston within the upper chamber 124 to a value higher than the pressure within chamber 104. The reason for this is that the fluid within chamber 124 does not have any velocity component. Therefore, there is a higher static pressure within the upper chamber 124. When the fluid velocity is high enough, the pressure force down against the diaphragm 96 is greater than the sum of all of the upward forces. When the predetermined pressure is reached, the diaphragm moves the piston downwardly such that the piston snaps closed against extension seating surface 112 as illustrated in FIG. 5.

Figure 5:
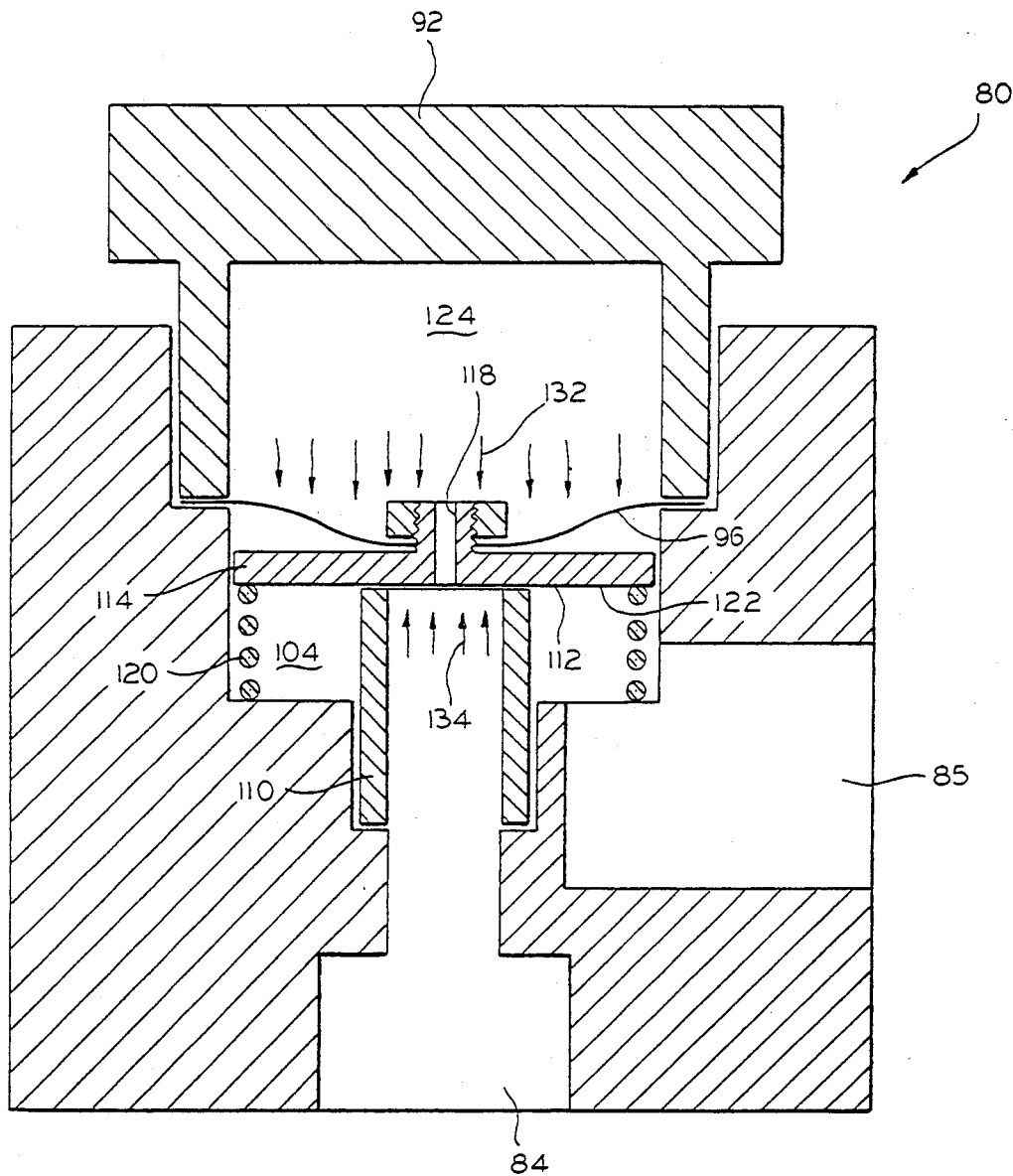
FIG. 5 is another cross-sectional side view of the steam trap of FIG. 4 but illustrating the steam trap in its self locked, closed position.

Referring now to FIG. 5 it can be seen that the piston 114 has been moved to its closed position whereby the surface 122 of the piston is in sealing engagement with the seating surface 112 of the input port extension 110. Once the steam trap is closed in this condition, the top portion of the diaphragm is exposed to the same pressure as the seat portion of the piston by virtue of the fluid flow through the orifice 118. Because the diaphragm has a greater area than the transverse cross-sectional area of the input port extension 110, the force downward on the diaphragm as indicated by the arrows 132 is greater than the upward force against the piston 114 as indicated by the arrows 134. Hence, the piston 114 is thereby held in the position against the seating surface 112 as illustrated. Also therefore, the steam trap 80 is held in its self locked, closed position when the fluid pressure reaches a predetermined pressure, such as, at or below the on-stream pressure.

When the pressure drops below the closing pressure, the spring force of the spring 120 will force the piston away from the input port extension seating surface 112. Thereafter, the process just described is repeated.

As can be seen from the foregoing, the present invention provides new and improved steam traps for use in steam systems. The steam traps are capable of expelling large quantities of condensate fluid at low pressures and for being self locked in a closed position at pressures above a predetermined pressure such as at or below the on-stream pressure of the steam system.

What is claimed is:

1. A steam trap for expelling large quantities of condensate fluid at low pressures and for self locking at pressures above a predetermined pressure comprising:
    a body including an input port, and an output port;
    a chamber within said body communicating with said output port, said chamber having sidewalls and an annular shoulder adjacent said sidewalls;
    said input port including an extension extending into said chamber and having an end surface forming a seating surface within said chamber;
    closure means for automatically opening and closing said steam trap, said closure means being disposed within said chamber in substantially sealing engagement with said chamber sidewalls, said closure means having an orifice aligned with said input port extension and a surface area greater than the transverse cross-sectional area of said input port extension, said closure means also being movable within said chamber between a position in sealing engagement with said extension seating surface and a position displaced from said extension seating surface; and
    biasing means extending between said annular shoulder and said closure means for resiliently urging said closure means away from engagement with said extension seating surface; whereby,
    when the steam pressure at said input port is below said predetermined pressure, said biasing means displaces said closure means away from said extension seating surface permitting condensate fluid to flow from said input port, through said extension into said chamber, and out said output port, when the steam pressure at said input port increases, the fluid flow velocity within said chamber causes a pressure differential across said closure means urging said closure means toward said extension seating surface, and when said predetermined pressure is reached, said closure means is locked against said extension seating surface by virtue of the difference between the surface area of said closure means and the transverse cross-sectional area of said input port extension, thereby preventing fluid flow from said input port to said output port.

2. A steam trap as defined in claim 1 wherein said closure means includes a piston and wherein said orifice extends through said piston.

3. A steam trap as defined in claim 2 wherein said chamber includes an end wall and wherein said piston includes spacer means for spacing said piston away from said chamber end wall when fully displaced from said input port extension.

4. A steam trap as defined in claim 3 wherein said spacer means comprises a flange extending from said piston toward said end wall.

5. A steam trap as defined in claim 4 wherein said flange makes sealing engagement with said chamber sidewalls.

6. A steam trap as defined in claim 5 wherein said flange is integrally formed with said piston.

7. A steam trap as defined in claim 1 wherein said input port extension includes a cylindrical member.

8. A steam trap as defined in claim 7 wherein said body includes a bore communicating with said chamber, said bore forming an annular surface, and wherein said cylindrical member is confined within said bore and abuts said annular surface.

9. A steam trap as defined in claim 1 wherein said biasing means comprises a spring.

10. A steam trap as defined in claim 2 wherein said piston includes an annular sealing member in sealing engagement with said chamber sidewalls.

11. A steam trap as defined in claim 10 wherein said sealing member is an o-rign.

12. A steam trap as defined in claim 10 wherein said piston includes an annular groove, and wherein said sealing member is disposed within said groove.

13. A steam trap as defined in claim 2 further including a resilient diaphragm for supporting said piston within said chamber.

14. A steam trap as defined in claim 13 wherein said diaphragm makes sealing engagement with said chamber sidewalls.

15. A steam trap as defined in claim 14 wherein said diaphragm includes a center aperture, wherein said piston includes a center threaded extension threaded to be received through said diaphragm aperture, and wherein said closure means further includes a nut member for threadingly engaging said piston extension and securing said piston to said diaphragm.

16. A steam trap as defined in claim 15 wherein said piston orifice extends through said piston extension.

17. A steam trap as defined in claim 13 wherein said biasing means comprises a spring.

* * * * *